United States Patent
Garandeau

(10) Patent No.: US 7,307,671 B2
(45) Date of Patent: Dec. 11, 2007

(54) DEVICE FOR RECEIVING VIDEO SIGNALS AND A METHOD OF CONTROLLING ONE SUCH DEVICE

(75) Inventor: Philippe Garandeau, Mezieres (FR)

(73) Assignee: Thomson Licensing, Boulogne-Billancourt (FR)

(*) Notice: Subject to any disclaimer, the term of this patent is extended or adjusted under 35 U.S.C. 154(b) by 481 days.

(21) Appl. No.: 10/494,172

(22) PCT Filed: Oct. 17, 2002

(86) PCT No.: PCT/FR02/03560

§ 371 (c)(1),
(2), (4) Date: Apr. 30, 2004

(87) PCT Pub. No.: WO03/039139

PCT Pub. Date: May 8, 2003

(65) Prior Publication Data

US 2005/0240973 A1    Oct. 27, 2005

(30) Foreign Application Priority Data

Oct. 30, 2001  (FR) .................................. 01 14252

(51) Int. Cl.
*H04N 5/50* (2006.01)

(52) U.S. Cl. .................... 348/731; 348/725; 348/732; 725/38

(58) Field of Classification Search ............... 347/725, 347/731–732, 726, 563–564, 569, 570, 559, 347/388.1, 553–554; 725/38, 131, 139, 151, 725/100; H04N 5/50
See application file for complete search history.

(56) References Cited

U.S. PATENT DOCUMENTS

| | | | | |
|---|---|---|---|---|
| 4,977,455 A | * | 12/1990 | Young | 348/460 |
| RE34,340 E | * | 8/1993 | Freeman | 725/78 |
| 5,933,192 A | | 8/1999 | Crosby et al. | 348/387 |
| 6,334,217 B1 | | 12/2001 | Kim | 725/38 |
| 6,473,137 B1 | * | 10/2002 | Godwin et al. | 348/725 |
| 6,804,824 B1 | * | 10/2004 | Potrebic et al. | 725/38 |
| 6,985,188 B1 | * | 1/2006 | Hurst, Jr. | 348/553 |

FOREIGN PATENT DOCUMENTS

| | | |
|---|---|---|
| JP | 10-294930 | 11/1998 |
| JP | 11-27102 | 1/1999 |
| WO | 99/16247 | 4/1999 |
| WO | 00/16544 | 3/2000 |

OTHER PUBLICATIONS

Patent Abstracts of Japan, vol. 1999, No. 04, Apr. 30, 1999 & JP 11-027102.
Patent Abstracts of Japan, vol. 1999, No. 02, Feb. 26, 1999 & JP 10-294930.
Search report dated Mar. 6, 2003.

* cited by examiner

*Primary Examiner*—Trang U. Tran
(74) *Attorney, Agent, or Firm*—Joseph J. Laks; Robert D. Shedd; Brian J. Cromarty

(57) ABSTRACT

The invention relates to a device for receiving video signals comprising a first decoding chain, a second decoding chain, a video encoder and a selection means which is used selectively to connect the first decoding chain or the second decoding chain to the video encoder. The invention also relates to a method of controlling one such device.

8 Claims, 1 Drawing Sheet

DEVICE FOR RECEIVING VIDEO SIGNALS AND A METHOD OF CONTROLLING ONE SUCH DEVICE

This application claims the benefit, under 35 U.S.C. 365 of International Application PCT/FR02/03560, filed Oct. 17, 2002, which was published in accordance with PCT Article 21(2) on May 8, 2003 in French and which claims the benefit of French patent application No. 0114252, filed Oct. 30,2001.

BACKGROUND OF THE INVENTION

1. Field of the Invention

The present invention relates to a device for receiving video signals and to a method of controlling such a device.

2. Description of the Prior Art

To ensure their transport, whether through the air or by cable, video signals are generally modulated by a carrier at a given frequency which depends on the program concerned. The video signal is thereafter brought back to baseband by a tuner/demodulator assembly, also dubbed the front end. Various processing operations may thereafter be performed on the signals received by additional circuits as a function of the type of signal used.

When zapping from one program to another (hopping) at the request of the user, the tuner aligns itself to a new carrier frequency thereby bringing about the reception of a new signal and its possible processing by the additional circuits. In practice, these operations are not instantaneous and a noticeable time span may elapse between the user's command and the displaying of the new program.

If no particular measure is taken, the display screen shows nothing ("black screen") during this span of time, this of course being prejudicial to the visual comfort of the user.

Solutions have already been proposed for attempting to remedy this drawback.

In patent applications EP 0 306 704 and JP 2000 032 338, it has been proposed that during a change of program a still image emanating from the initial program be displayed until the new program can be displayed. In patent application EP 0 712 242, it has been proposed that a predetermined still image be displayed.

In patent application WO 99/16 247, images of type I (intra coding images) contained in MPEG type streams corresponding to several programs are stored; during a change of program, if the new program is a program for which an image of type I is stored, this (still) image is displayed.

These solutions only slightly improve visual comfort for the user: admittedly they replace the black screen by a still image, but they do not in any way improve the fluidity of display.

SUMMARY OF THE INVENTION

The invention proposes a novel solution for improving the visual comfort of the user upon a change of program: a device for receiving video signals comprises a first decoding chain, a second decoding chain, a video encoder and a means of selection for selectively connecting the first decoding chain or the second decoding chain to the video encoder.

According to other advantageous characteristics, the device comprises a means of detection of the state of at least one of the first and second decoding chains generating a state cue and a means of control of the means of selection as a function of the state cue;

the device comprises a user interface able to transmit a program cue to the means of control;

the first and the second decoding chain are able to each generate a digital video stream;

the first and the second decoding chain each comprise a video decoder;

at least one of the first and second decoding chains comprises a descrambler.

The invention also proposes a method of controlling such a device which comprises the following steps:

command of the means of selection for connection of the first decoding chain to the video encoder;

reception of a signal comprising a program cue;

command of the second decoding chain for reception of the program designated by the program cue;

maintenance of the command of the means of selection for connection of the first decoding chain to the video encoder as long as the second decoding chain is generating no video stream;

control of the means of selection for connection of the second decoding chain to the video encoder when the second decoding chain is generating a video stream.

BRIEF DESCRIPTION OF THE DRAWINGS

The description of an exemplary embodiment of the invention will be given with reference to FIG. 1 which represents the essential elements of a digital decoder.

DESCRIPTION OF THE PREFERRED EMBODIMENT

Figure 1:
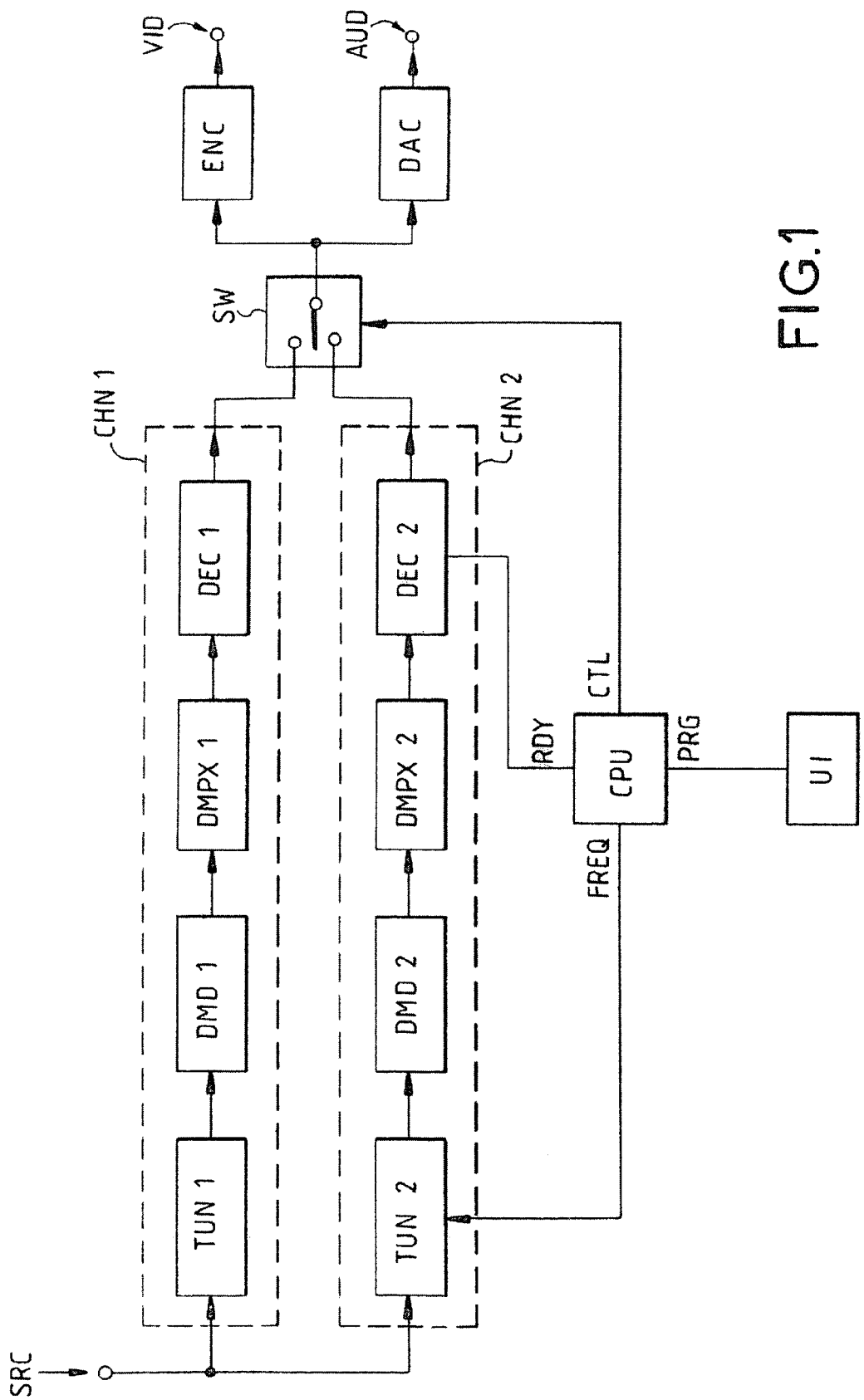

A digital decoder is a device for receiving video signals coded (in general according to the MPEG standard), multiplexed and modulated by a carrier for their transport by cable or through the air (satellite or RF communication).

The digital decoder whose main elements are represented in FIG. 1 comprises two decoding chains CHN1, CHN2.

Each decoding chain CHN1, CHN2 is connected at input to a common source SRC of video signals, for example an antenna or a cable of a local network.

Each decoding chain CHN1, CHN2 comprises a tuner TUN1, TUN2, a demodulator DMD1, DMD2, a demultiplexer DMPX1, DMPX2 and an audio/video decoder DEC1, DEC2 placed in series.

Each decoding chain CHN1, CHN2 thus generates, from the video signals emitted by the common source SRC, a digital audio/video stream corresponding to the program associated with the tuning frequency of the tuner TUN1, TUN2. The digital stream is for example of the 4:2:2 type according to the CCIR 601 standard.

The output of each decoding chain CHN1, CHN2 is connected to an input of a switch SW whose output is connected to the respective inputs of a video encoder ENC and of an audio digital/analog converter DAC.

The switch SW makes it possible to selectively connect the output of the first decoding chain CHN1 or the output of the second decoding chain CHN2 to the audio converter DAC and to the video encoder ENC. The switch SW is controlled by a microprocessor CPU as explained later.

The video encoder ENC converts the digital stream that it receives from the first decoding chain CHN1 or from the second decoding chain CHN2 into an analog video signal. The analog video signal is for example a composite video signal (CVBS according to the usual initials) or a signal with three color components RGB. This analog video signal is made available to the user on a connector VID (for example one or more pins of a Scart socket) so as to be displayed on a conventional viewing device, for example a television set.

In a similar manner, the audio converter DAC converts the audio digital stream into an analog audio signal heading for an output connector AUD, for example pins 1 and 3 of a Scart socket.

The microprocessor (here central processing unit) CPU is connected to the various elements of the digital decoder for exchanging information and commands with them. However, for the sake of clarity, only the connections necessary for explaining the invention appear in FIG. 1.

In particular, for any connection between the microprocessor CPU and an element of the second decoding chain CHN2, there also exists a corresponding connection (not represented) between the microprocessor CPU and the equivalent element in the first decoding chain CHN1.

The microprocessor CPU controls the switch SW through a control line CTL. The microprocessor CPU also sends a frequency cue FREQ to the tuner TUN2 of the second decoding chain CHN2. This frequency cue FREQ is in general an integer translated into frequency to be received by the tuner TUN2.

The microprocessor CPU also talks to a user interface UI from which it receives in particular a program cue PRG. The user interface UI generally comprises an infrared receiver that receives infrared signals from a remote control and translates them into a program cue PROG that can be understood by the microprocessor CPU. The program cue PROG indicates the program (that is to say the station or the channel) that the user wishes to receive.

The microprocessor CPU is also connected to the audio/video decoder DEC2 of the second decoding chain CHN2 which sends it in particular a state cue RDY which indicates whether the audio/video decoder DEC2 is or is not ready, that is to say whether it will be compressed without error and emit a valid or invalid digital stream. This state cue RDY is for example a software state of the driver (or pilot) that manages the audio/video decoder DEC2.

A program change phase as proposed by the invention will now be described.

For the sake of explanation it will be assumed that the switch SW links the first decoding chain CHN1 (more precisely its audio/video decoder DEC1) to the audio converter DAC and to the video encoder ENC. The digital decoder therefore generates on its video VID and audio AUD outputs analog signals of a program corresponding to the frequency received by the tuner TUN1.

The program change phase (hopping) is initiated by the receipt of a program cue PRG by the microprocessor. In the example described here, the program cue PRG originates from a user interface UI (for example, at the outset, from a remote control operated by the user). The invention is however not limited to this example: the program cue PRG could also originate from another video apparatus, such as a pre-programmed video recorder that indicates to the digital decoder the program to be received by the latter so as to be recorded in the recorder.

The microprocessor CPU thereafter translates the program cue PRG into a frequency cue FREQ by means of a lookup table stored in a memory (not represented) associated with the microprocessor CPU.

The frequency cue FREQ is then sent to the tuner TUN2 of the second decoding chain CHN2. The tuner TUN2 will search for a signal at the frequency indicated by the frequency cue FREQ, this not necessarily being immediate.

Once the tuner TUN2 has correctly received the desired signal (i.e. when the tuner TUN2 has locked on), the video signal received is transmitted through the other elements of the second decoding chain CHN2, namely the demodulator DMD2, the demultiplexer DMPX2 and the audio/video decoder DEC2. Each element, and notably the audio/video decoder DEC2, generates valid signals at output only after a certain span of time relative to the receipt of the signals at input.

According to a possible variant, a descrambler is introduced into each decoding chain between the demultiplexer and the audio/video decoder. The implementation of the descrambler also requires a certain span of time since it is necessary to recover the keys that are encrypted in the stream and then to perform a digital computation to be able to descramble the audio and video streams.

It is important to note that, as long as the audio/video decoder DEC2 is generating no valid digital stream at output and thus the state cue RDY indicates that the audio/video decoder DEC2 is not ready, the command of the microprocessor CPU to the switch SW is maintained (such as it was before the program change phase): the switch SW connects the first decoding chain CHN1 to the audio converter DAC and to the video encoder ENC.

Throughout the start of the program change phase, as long as the audio/video decoder DEC2 of the second chain CHN2 is not ready, the digital decoder therefore continues to generate on its video VID and audio AUD outputs analog signals corresponding to the program received by the first decoding chain CHN1.

When the audio/video decoder DEC2 of the second decoding chain CHN2 generates a valid digital stream at output, the state cue RDY indicates that the audio/video decoder DEC2 is ready. When the microprocessor CPU receives this state cue RDY "ready", it modifies its command CTL to the switch SW so that the latter connects the second decoding chain CHN2 (and specifically the output of its audio/video decoder DEC2) to the audio converter DAC and to the video encoder ENC.

From this moment onwards, the digital decoder therefore generates on its audio AUD and video VID outputs analog signals that correspond to the program received by the second decoding chain CHN2.

The change of program is therefore performed.

The next change of program may of course be performed in a similar manner to the change of program described above by reversing the role of the first and of the second decoding chain.

The invention is of course not limited to the example described above.

Moreover, to simplify the figures, the connections between the various elements are represented by a simple line even though in practice several parallel connections (buses) are involved.

The invention claimed is:

1. A device for receiving video signals comprising:
   a first decoding chain;
   a second decoding chain;
   a video encoder;
   a means of selection for selectively connecting an output of the first decoding chain or an output of the second decoding chain to the video encoder;
   a means of detection of the state of at least one of the first and second decoding chains generating a state cue; and
   a means of control of the means of selection as a function of the state cue.

2. Device as claimed in claim 1, comprising a user interface able to transmit a program cue to the means of control.

3. Device according to claim 1, in which the first and the second decoding chain are able to each generate a digital video stream.

4. Device according claim 1, in which the first and the second decoding chain each comprise a video decoder.

5. Device according to claim 1, in which at least one of the first and second decoding chains comprises a descrambler.

6. A method of controlling a device as claimed in claim 1, comprising the following steps:
  command of the means of selection for connection of the first decoding chain to the video encoder;
  reception of a signal comprising a program, cue;
  command of the second decoding chain for reception of the program designated by the program cue;
  maintenance of the command of the means of selection for connection of the first decoding chain to the video encoder as long as the second decoding chain is generating no video stream;
  command of the means of selection for connection of the second decoding chain to the video encoder when the second decoding chain is generating a video stream.

7. Method of controlling a device as claimed in claim 1, comprising the following steps:
  command of the means of selection for connection of the first decoding chain to the video encoder;
  reception of a signal comprising a program cue;
  command of the second decoding chain for reception of the program designated by the program cue;
  maintenance of the command of the means of selection for connection of the first decoding chain to the video encoder as long as the state cue of the means of detection indicates that the second decoding chain is generating no video stream;
  control of the means of selection for connection of the second decoding chain to the video encoder when the state cue of the means of detection indicates that the second decoding chain is generating a video stream.

8. Method of controlling a device as claimed in claim 2, comprising the following steps:
  command of the means of selection for connection of the first decoding chain to the video encoder;
  reception of the program cue from user interface;
  command of the second decoding chain for reception of the program designated by the program cue;
  maintenance of the command of the means of selection for connection of the first decoding chain to the video encoder as long as the state cue of the means of detection indicates that the second decoding chain is generating no video stream;
  control of the means of selection for connection of the second decoding chain to the video encoder when the state cue of the means of detection indicates that the second decoding chain is generating a video stream.

* * * * *